Patented Oct. 10, 1950

2,525,380

UNITED STATES PATENT OFFICE 2,525,380

6,7-PHTHALOYLQUINAZOLINE VAT DYE-STUFFS AND PROCESS OF MAKING SAME

Paul Sutter, Binningen, and Walter Kern, Sissach, Switzerland, assignors to Ciba Limited, Basel, Switzerland, a Swiss firm No Drawing. Application January 11, 1949, Serial No. 72,538. In Switzerland February 5, 1948

3 Claims. (Cl. 260—262)

According to this invention valuable vat dyestuffs are made by reacting a 4-halogen-6,7-phthaloyl-quinazoline, which contains as a substituent in the 2-position an aryl residue containing at least two rings, with an amine capable of being vatted.

The phthaloyl-quinazolines used as starting materials are new, but they can be prepared by methods in themselves known. Especially advantageous is the method forming the subject of patent application Serial No. 756,808, filed June 24, 1947, in which a 2-acylamino-anthraquinone-3-nitrile is reacted, for example, with phosphorus pentachloride, whereby the quinazoline ring is formed without the isolation of an intermediate product.

The above mentioned 6,7-phthaloyl-quinazolines may with advantage contain chlorine as the halogen atom in the 4-position, and the aryl residue containing at least two rings and present in the 2-position may, for example, be wholly aromatic and contain exclusively aromatic six-membered carbon rings. The six-membered carbon rings may be fused together or connected to each other by a simple carbon-to-carbon bond. As examples of such aryl residues there may be mentioned the residues of pyrene, chrysene, fluoranthene, phenanthrene and especially residues having only two rings, for example, the residue of naphthalene or of diphenyl.

Since the halogen atom in the 4-position of the quinazoline ring is reactive, the starting materials react easily with amines capable of being vatted. As vattable amines there come into consideration, more especially, amines of the anthraquinone series such as 1-aminothraquinone, in which the anthraquinone residue may contain substituents such as are usually present in known vat dyestuffs, especially alkoxy groups, halogen atoms, acylamino and especially benzoylamino groups, or the like. It is of special advantage to use as vattable amines aminoanthraquinones which contain fused-on rings, especially aminoanthraquinone-acridones such as 4-aminoanthraquinone-2,1-(N)-1′,2′(N)-benzacridones, for example, 4-aminoanthraquinone-2,1(N)-benzacridone.

The reaction of the aforesaid halogen-quinazolines with vattable amines is advantageously conducted in a high boiling solvent or diluent at a raised temperature, for example, at 150–250° C. Besides the high boiling solvents usually employed for reactions of this type, phenol may in some cases be used with advantage.

The products of the invention are valuable vat dyestuffs, and may be described as 6,7-phthaloyl-quinazolines which contain as a substituent in the 4-position the residue of a vattable amine and as a substituent in the 2-position an aryl residue containing at least two rings. Of special importance are products which contain as a substituent in the 4-position the residue of a 4-aminoanthraquinone-2,1(N)-benzacridone. The latter products yield dyeings of especially valuable pure yellowish green tints not easily obtainable in other ways. The dyeings are distinguished by combining good fastness to light with good properties of wet fastness and relatively pure tints.

The vat dyestuffs of the invention can be used for dyeing or printing by the usual methods. Especially valuable is the fact that they dye with good absorption at moderate dyeing temperatures of 40–50° C. and can therefore be used in conjunction with a very large number of ether vat dyestuffs.

The following examples illustrate the invention, the parts and percentages being by weight unless otherwise stated and the relationship of parts by weight to parts by volume being the same as that of the kilogram to the liter:

Example 1

8 parts of 2-diphenyl-4-chloro-6,7-phthaloyl-quinazoline of the formula

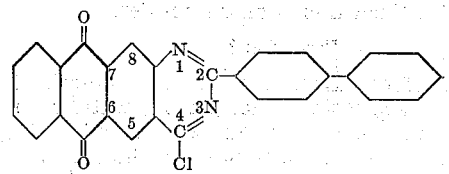

and 6.1 parts of 4-aminoanthraquinone-2,1 (N)-benzacridone are heated in 200 parts of phenol for ½ hour at boiling temperature, hydrochloric acid being given off. 200 parts of pyridine are added, the whole is allowed to cool to about 50° C., the precipitate is separated by filtering with suction, and the filter residue is washed with alcohol and dried. In this manner there is obtained in good yield a green powder which dyes cotton from a violet-brown vat strong yellow-green tints of excellent fastness.

Similar dyestuffs are obtained by using 4-aminoanthraquinone-2,1 (N) - benzacridones, which contain in the benz-nucleus a chlorine atom, for example, in the 4-, 5- or 6-position.

The above-mentioned 2-diphenyl-4-chloro-6,7-phthaloyl-quinazoline may be prepared by heating 2-(4'-phenyl)-benzoylamino-3-cyananthraquinone of the formula

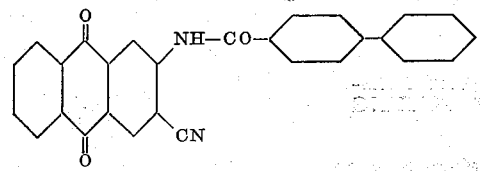

in nitrobenzene with phosphorus pentachloride. It is a yellow-brown crystalline powder.

*Example 2*

6 parts of 2-(2'-naphthyl)-4-chloro-6,7-phthaloyl-quinazoline of the formula

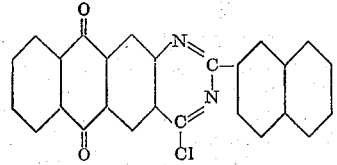

and 4.8 parts of 4-amino-2,1(N)-benzacridone are heated in 150 parts of phenol for ½ hour at boiling temperature, hydrochloric acid being given off. 150 parts of pyridine are added, the whole is allowed to cool to about 50° C., the precipitate is separated by filtering with suction, and the filter residue is washed with alcohol and dried. There is obtained in good yield a dark green powder, which dyes cotton from a violet-brown vat strong yellow-green tints of excellent fastness.

Similar dyestuffs are obtained by using 4-amino anthraquinone -2,1 (N) - benzacridones, which contain as a substituent in the benz-nucleus a chlorine atom, for example in the 4-, 5- or 6- position.

The above mentioned 2-(2'-naphthyl)-4-chloro-6,7-phthaloyl-quinazoline may be prepared by heating 2-(2'-naphthoyl)-amino-3-cyan-anthraquinone of the formula

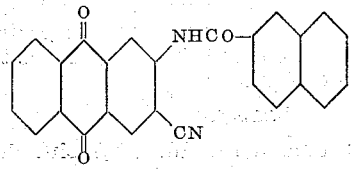

in nitrobenzene with phosphorus pentachloride. It is a yellow-brown crystalline powder.

*Example 3*

1.5 parts of the dyestuff obtained as described in Example 1 are vatted in 200 parts of water with the addition of 6 parts by volume of caustic soda solution of 36° Bé. and 3 parts of sodium hydrosulfite at about 60° C. The resulting stock vat is added to a dyebath which contains in 2800 parts of water 9 parts by volume of caustic soda solution of 36° Bé. and 6 parts of sodium hydrosulfite. 100 parts of bleached cotton are entered at 40° C., 60 parts of sodium chloride are added after 15 minutes, the temperature is raised to 50° C., and dyeing is carried on at that temperature for 45 minutes. The cotton is then squeezed, oxidized by exposure to air, rinsed, acidified and again rinsed, and, if desired soaped at the boil. The cotton is dyed a fast yellow-green tint.

What we claim is:

1. A 6,7-phthaloylquinazoline which corresponds to the formula

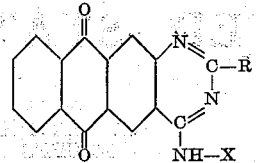

in which X stands for the radical of a 4-anthraquinonyl-2,1(N)-benzacridone, and R stands for the radical of an aromatic hydrocarbon containing at least 10 and at the most 18 carbon atoms and at least two and not more than four rings.

2. The yellowish green vat dyestuff of the formula

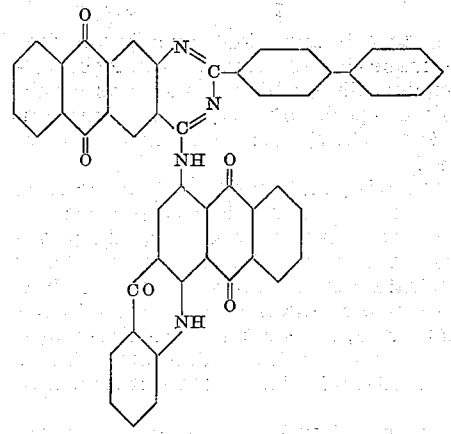

3. The yellowish green vat dyestuff of the formula

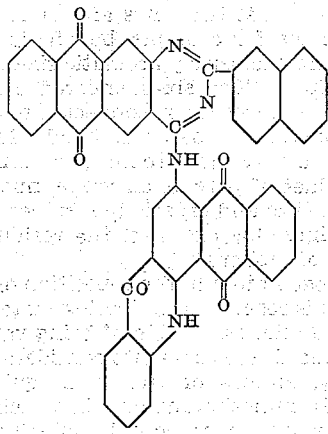

PAUL SUTTER.
WALTER KERN.

REFERENCES CITED

The following references are of record in the file of this patent:

UNITED STATES PATENTS

| Number | Name | Date |
|---|---|---|
| 2,187,813 | Baumann et al. | Jan. 23, 1940 |